Patented Jan. 3, 1939

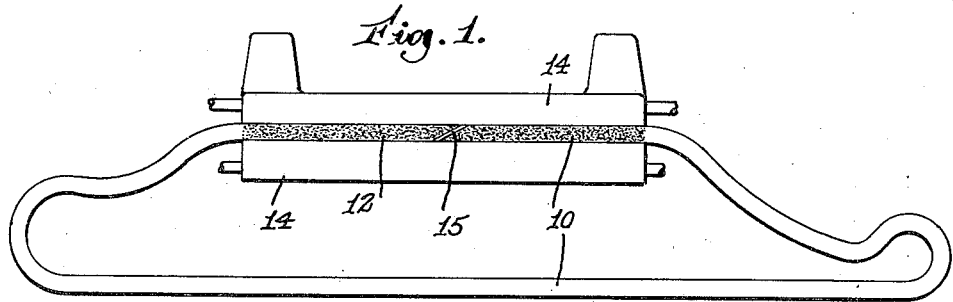
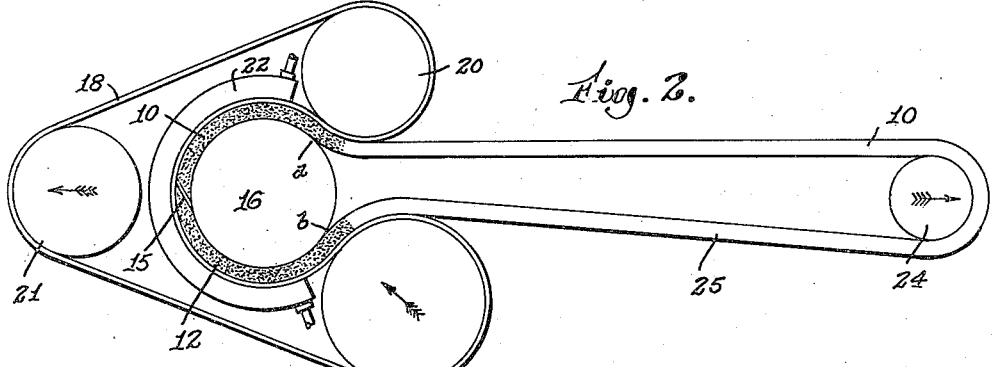
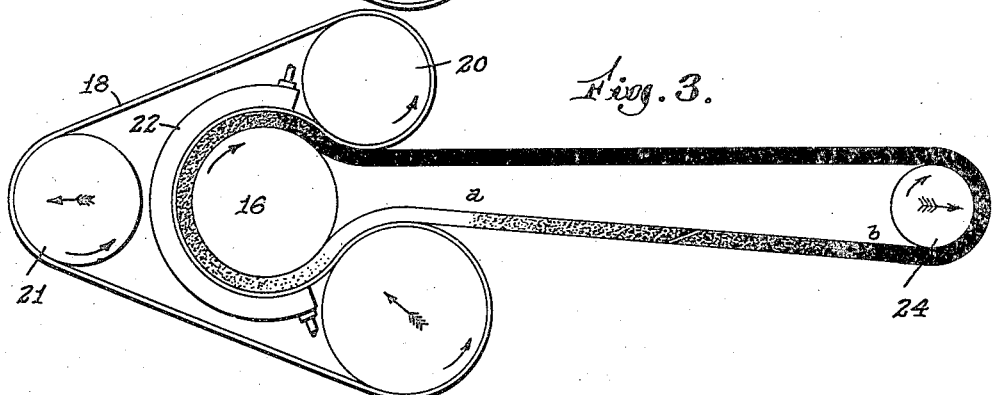
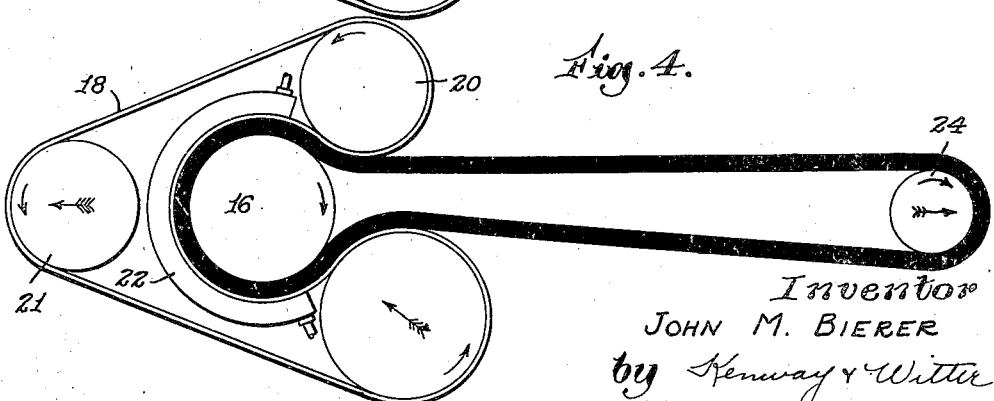

2,142,972

UNITED STATES PATENT OFFICE 2,142,972

PROCESS OF CURING ENDLESS BELTS

John M. Bierer, Waban, Mass., assignor to Boston Woven Hose & Rubber Company, Cambridge, Mass., a corporation of Massachusetts Application July 27, 1937, Serial No. 155,951

9 Claims. (Cl. 18—53)

This invention relates to a novel process of continuously curing endless belting having rubber or other material in its composition which requires vulcanizing or heat curing in producing the final product. Heretofore, endless belting has been cured between heated surfaces in a step by step manner which has necessitated an overlapping of the treated areas with resulting overcured spots and lack of uniformity in the product. In use these overcured spots, or any areas which are denser or harder than the body of the belting, show up as defects and wear out before the rest of the belt. Continuous vulcanizing machines have been used heretofore for imparting a uniform cure to belting that is not endless, but in such machines an end of the belting must be led to the heated vulcanizing surface which of course is impossible in the curing of endless belts.

I have discovered that an endless belt may be continuously cured in like manner as is non-endless belting by first imparting to a section thereof an initial cure and thereafter completing the curing of the belt by continuously passing it between and in pressure contact with heated surfaces, beginning at one junction of said section with the remaining portion of the belt and moving the belt in a direction passing said portion onto the heated surfaces. The initial cure is imparted by holding the belt immovably between and in contact with heated surfaces and the extent of such cure may be partial or complete in accordance with the procedure to be followed and the nature of the product treated. Furthermore, the initial cure will ordinarily be substantially uniform throughout the area of the section, as distinguished from a graduated initial cure such as is disclosed in my co-pending application, Serial No. 59,078, filed January 14, 1936.

The invention contemplates the employment of a heated vulcanizing cylinder for performing the continuous curing step of the process and the initial curing step may be performed on this same cylinder or on a flat press, all as hereinafter more specifically described. Another feature of the invention contemplates the vulcanizing of an endless belt having a splice in its outside cover. There is always some overlapping of rubber and fabric materials at such splices and the splice is somewhat bulky and weak in tensile strength as compared with the remainder of the belt. I have discovered that this condition can be remedied in large degree in the completed product and the continuous vulcanizing of the belt be facilitated by giving the splice area an initial semi-curing treatment. Thus in accordance with this feature of the invention, I prefer to apply the initial curing treatment to the splice area and to carry the same to a point considerably short of complete cure, it being understood however that my invention is not limited to this specific procedure.

These and other features of the invention will be best understood and appreciated from the following description of a preferred embodiment thereof, selected for purposes of illustration and shown in the accompanying drawing in which, Fig. 1 is a diagrammatic view illustrating the initial curing of a section of an endless belt in a flat vulcanizing press, Fig. 2 is a diagrammatic view illustrating the initial position of such a belt on the vulcanizing drum of a continuous curing apparatus, Fig. 3 is a diagrammatic view illustrating the continuous curing operation, Fig. 4 is a like diagrammatic view illustrating the position of the belt when the curing treatment is completed.

The first step of my novel process may be carried out by any apparatus suitable for imparting an initial cure to a section of the uncured endless belt 10. In Fig. 1 I have illustrated a section 12 of the belt as engaged between the two opposed and heated plates 14 of a flat press. It is furthermore noted that, in accordance with a preferred feature of the process, the splice 15 in the belt cover is located within this section. This curing step may be carried out to any degree from a slight cure sufficient to avoid sticking of the belt to the plates, usually about a one-third cure, to a complete cure, the extent of the cure depending upon the procedure to be followed and the nature of the product treated. Following this step the belt is transferred to the continuous curing apparatus wherein it is treated in the manner illustrated in Figs. 2, 3 and 4.

The apparatus diagrammatically illustrated in Figs. 2-4 is of the nature of that illustrated in my copending application Serial No. 64,724, filed February 19, 1936. This comprises a vulcanizing cylinder 16 against about 270° of the circumference of which is pressed an endless steel band 18. The band is supported on rolls 20 and 21 and may be tightened by moving the roll 21 rearwardly. The cylinder is steam heated and that portion of the band opposing the cylinder is also heated by steam jackets 22. The belt to be treated is supported on the cylinder and on a roll 24 and means is provided for rotating the cylinder slowly in the direction of the arrow, it being understood that the band 18 is tightened to compress the belt between the band and the cylinder and the roll 24 is adjusted to place the belt under proper tension.

The next step following that illustrated in Fig. 1 and above described, comprises placing the initially treated belt in the continuous curing apparatus in the position illustrated in Fig. 2, the cylinder 16 and jackets 22 being cold at this time. The initially cured section 12 is located in contact with the cylinder with both ends thereof extending beyond the contact, the length of such section being slightly longer than the contacting surface. This arrangement avoids initial contact of uncured belting with the cylinder and consequent sticking when the cylinder is heated. Steam is now turned on and the cylinder and band brought up to vulcanizing temperature. When the cylinder and band reach vulcanizing temperature rotation of the cylinder is started and slowly continued until the band reaches the position of Fig. 4, this position being the same as the starting position illustrated in Fig. 2. When the band reaches this position of Fig. 4 the apparatus is stopped and the cylinder and band are cooled and the belt removed.

The temperature of the cylinder and band and the time contact of the belt therewith are such that a complete cure is effected during one passage of the uncured belt through the apparatus. It will be apparent that as the apparatus starts moving from the position of Fig. 2 the uncured portion 25 of the belt rides onto the cylinder at the point $b$ as the initially cured portion 12 rides off the cylinder beginning at the point $a$. It is also apparent that during movement of the belt from the position of Fig. 2 to that of Fig. 4 the following cures are effected: (1) the section 12 is given a further cure increasing from 0 at $a$ to a maximum cure at $b$, (2) the portion 25 is given a continuous complete cure, and (3) the section 12 is given an additional further cure increasing from 0 at $b$ to a maximum at $a$. The final result is that the belt has been given a full and continuous cure and a super-cure in section 12 equal to the initial cure given thereto.

The primary purpose of the initial cure is to prevent the sticking of the belt to the heated surfaces and the extent of this cure may be varied from a slight cure, usually substantially one-third cure, to a full cure. In most cases a semi-cure is sufficient for all purposes and is preferred even though the process may be carried out and a satisfactory product produced by continuing the initial cure further. It will be understood that the initial cure permits immediate separation of the belt from the cylinder at the point $a$ upon starting the apparatus and it should furthermore be emphasized that the initial curing of the splice area, wherein the overlapping rubber and fabric causes a somewhat bulky and weaker area, greatly facilitates the continuous curing of this area and produces a superior and more uniform product.

While I have described the initial curing step as being carried out in a flat press, I desire it to be understood that any other satisfactory apparatus will serve the same purpose. For example, the process may be even further simplified by carrying out this initial curing in the continuous curing apparatus. In such case the raw uncured belt will be placed on the vulcanizing drum in the position illustrated in Fig. 2, the apparatus being cold at this time. Heat will then be turned on and the apparatus permitted to remain stationary until the desired initial curing has been effected. Rotation of the cylinder is then started and the continuous curing effected in the same manner as heretofore described.

Having thus described my invention what I claim as new and desire to secure by Letters Patent is,

1. The process of curing an endless belt which includes the steps of imparting to a section thereof an initial cure substantially uniform throughout the area of the section, moving the belt progressively and continuously into contact with a heated surface, beginning at one junction of said section with the remaining portion of the belt and in a direction and manner passing the belt onto said surface in said portion while separating the belt from the surface beginning in the area of said section, holding the belt continuously in contact with the heated surface during a predetermined travel of the surface and belt as a unit, and continuing such movement until the entire belt has been given a desired cure.

2. The process of curing an endless spliced belt in accordance with the steps defined in claim 1 in which the splice is within the said section given the initial cure.

3. The process of curing an endless belt which includes the steps of imparting to a section thereof an initial partial cure substantially uniform throughout the area of the section, moving the belt progressively and continuously into contact with a heated surface, beginning at one junction of said section with the remaining portion of the belt and in a direction and manner passing the belt onto said surface in said portion while separating the belt from the surface in the area of said section, holding the belt continuously in contact with the heated surface during a predetermined travel of the surface and belt as a unit and continuing such movement until the entire belt has been cured throughout its length.

4. The process of curing an endless spliced belt which includes the steps of imparting to a section thereof including the splice an initial partial cure, moving the belt progressively and continuously into contact with a heated surface, beginning at one junction of said section with the remaining portion of the belt and in a direction and manner passing the belt onto said surface in said portion while separating the belt from the surface in the area of said section, holding the belt continuously in contact with the heated surface during a predetermined travel of the surface and belt as a unit, and continuing such movement until the entire belt has been given a desired cure.

5. The process of curing an endless belt which includes the steps of holding a section thereof between and in contact with opposed heated surfaces until a predetermined cure has been effected in the area of said section, moving the belt progressively and continuously into contact with a heated surface, beginning at one junction of said section with the remaining portion of the belt and in a direction and manner passing the belt onto said surface in said portion while separating the belt from the surface beginning in the area of said section, holding the belt continuously in contact with the heated surface during a predetermined travel of the surface and belt as a unit, and continuing such movement until the entire belt has been given a desired cure.

6. The process of curing an endless belt which includes the steps of holding a section thereof between and in contact with opposed heated surfaces until a predetermined cure has been effected in the area of said section, moving the belt progressively and continuously into contact with a heated surface, beginning at one junction of said section with the remaining portion of the belt and in a direction and manner passing the belt onto said surface in said portion while separating the belt from the surface beginning in the area of said section, holding the belt continuously in contact with the heated surface during a predetermined travel of the surface and belt as a unit, and continuing such movement until the belt returns to its initial position relative to the heated surface.

7. The process of curing an endless spliced belt which includes the steps of holding a section thereof including the splice immovably between and in contact with heated surfaces until a partial cure has been effected in the area of said section, moving the belt progressively and continuously into contact with a heated surface, beginning at one junction of said section with the remaining portion of the belt and in a direction and manner passing the belt onto said surface in said portion while separating the belt from the surface beginning in the area of said section, holding the belt continuously in contact with the heated surface during a predetermined travel of the surface and belt as a unit, and continuing such movement until the entire belt has been given substantially a full cure.

8. The process of curing an endless belt which includes the steps of holding a section thereof immovable between and in compressed contact with two flat heated surfaces until an initial cure has been effected, moving the belt progressively and continuously into contact with a curved heated surface, beginning at one junction of said section with the remaining portion of belt and in a direction and manner passing the belt onto said curved surface in said portion while separating the belt from the curved surface beginning in the area of said section, holding the belt continuously in contact with the curved heated surface during a predetermined travel of the curved surface and belt as a unit, and continuing such movement until the entire belt has been given a desired cure.

9. The process of curing an endless belt which includes the steps of holding a section thereof immovably between and in compressed contact with two curved and continuous heated surfaces until an initial cure has been effected, moving the belt progressively and continuously into contact with said surfaces, beginning at one junction of said section with the remaining portion of the belt and in a direction and manner passing the belt onto said surfaces in said portion while separating the belt from said surfaces beginning in the area of said section, holding the belt continuously in contact with the surfaces during a predetermined travel of the surfaces and belt as a unit, and continuing such movement until the entire belt has been given a desired cure.

JOHN M. BIERER.